United States Patent
Handa et al.

(10) Patent No.: US 10,908,664 B2
(45) Date of Patent: Feb. 2, 2021

(54) POE POWER SUPPLY SYSTEM

(71) Applicant: DENSO CORPORATION, Kariya (JP)

(72) Inventors: Kunimitsu Handa, Kariya (JP);
Tomohisa Kishigami, Kariya (JP)

(73) Assignee: DENSO CORPORATION, Kariya (JP)

( * ) Notice: Subject to any disclaimer, the term of this patent is extended or adjusted under 35 U.S.C. 154(b) by 81 days.

(21) Appl. No.: 16/211,337

(22) Filed: Dec. 6, 2018

(65) Prior Publication Data
US 2019/0179390 A1     Jun. 13, 2019

(30) Foreign Application Priority Data

Dec. 11, 2017    (JP) ................................ 2017-236938

(51) Int. Cl.
| | | |
|---|---|---|
| G06F 1/3234 | (2019.01) | |
| H04L 12/10 | (2006.01) | |
| H04L 12/12 | (2006.01) | |
| G06F 1/26 | (2006.01) | |

(52) U.S. Cl.
CPC ............ *G06F 1/266* (2013.01); *G06F 1/3234* (2013.01); *H04L 12/10* (2013.01); *H04L 12/12* (2013.01)

(58) Field of Classification Search
CPC ....... G06F 1/266; G06F 1/3234; H04L 12/10; H04L 12/12
See application file for complete search history.

(56) References Cited

U.S. PATENT DOCUMENTS

| | | | | |
|---|---|---|---|---|
| 8,793,511 | B1* | 7/2014 | Bishara | ................... G06F 1/266 713/300 |
| 2011/0107116 | A1* | 5/2011 | Diab | ....................... H04L 12/10 713/300 |
| 2012/0060042 | A1* | 3/2012 | Buhari | ................... G06F 1/266 713/320 |
| 2017/0118030 | A1* | 4/2017 | Love | ..................... G06F 1/3243 |
| 2017/0272260 | A1* | 9/2017 | Han | ..................... G01R 19/165 |
| 2017/0338969 | A1* | 11/2017 | Paul | ....................... H04L 12/10 |

FOREIGN PATENT DOCUMENTS

JP         2008-294951 A     12/2008

\* cited by examiner

*Primary Examiner* — Jaweed A Abbaszadeh
*Assistant Examiner* — Gayathri Sampath
(74) *Attorney, Agent, or Firm* — Harness, Dickey & Pierce, P.L.C.

(57) ABSTRACT

A PoE power supply system includes a cable, a power supply device, a power reception device, and a request switch. The power supply device includes a power supply block and a power supply control block. The power supply block is configured to enable a connection state between the power supply device and the cable to be switched. The connection state includes a power supply state in which the power supply device is supplied with power required for operating the power supply device via the cable, and a standby state in which the power supply request signal is receivable by the power supply device via the cable. The power supply control block is configured to switch the connection state to the power supply state in response to receiving a power supply request signal output from the request switch and requesting the power supply device to resume supplying the power.

6 Claims, 5 Drawing Sheets

POE POWER SUPPLY SYSTEM

CROSS REFERENCE TO RELATED APPLICATION

The present application claims the benefit of priority from Japanese Patent Application No. 2017-236938 filed on Dec. 11, 2017. The entire disclosure of the above application is incorporated herein by reference.

TECHNICAL FIELD

The present disclosure relates to a PoE power supply system.

BACKGROUND

A Power over Ethernet (registered trademark) power supply system (hereinafter referred to as "PoE power supply system") supplies power from a power supply device to a power reception device via a cable.

For example, when an abnormality occurs in the power reception device, the power supply device may stop supplying the power to the power reception device.

SUMMARY

The present disclosure provides a PoE power supply system including a cable, a power supply device and a power reception device. A connection state between the power supply device and the cable is configured to be switchable. The connection state includes a power supply state in which the power supply device is supplied with power required for operating the power supply device via the cable, and a standby state in which a power supply request signal is receivable by the power supply device via the cable. The connection state is switched to the power supply state in response to receiving the power supply request signal.

BRIEF DESCRIPTION OF THE DRAWINGS

The above and other objects, features and advantages of the present disclosure will become more apparent from the following detailed description made with reference to the accompanying drawings in which.

DETAILED DESCRIPTION

Hereinafter, embodiments of the present disclosure will be described with reference to the drawings.

1. Configuration

Figure 1:
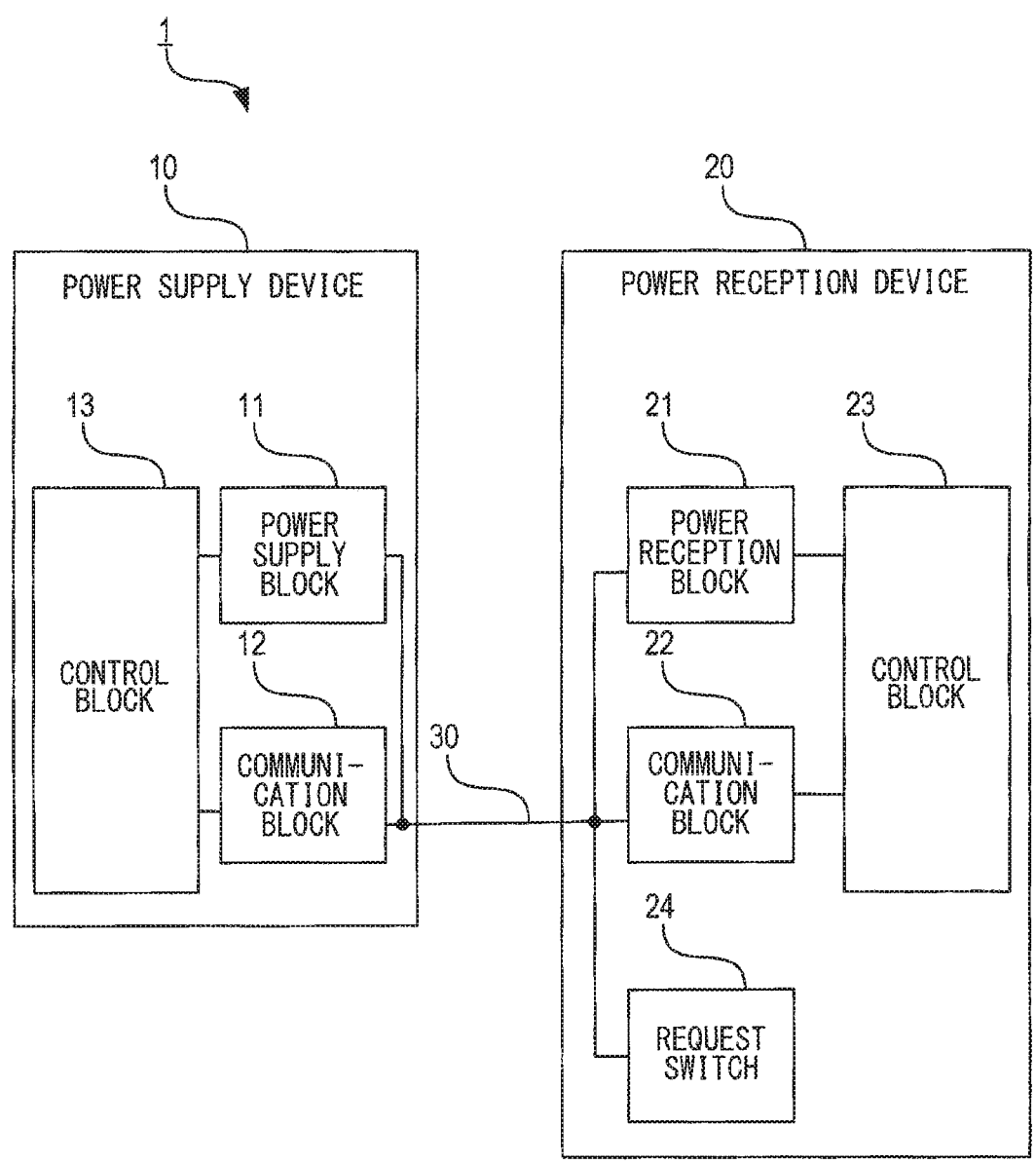
FIG. 1 is a block diagram showing a configuration of a PoE power supply system.

A PoE power supply system 1 shown in FIG. 1 includes a power supply device 10, a power reception device 20, and a cable 30.

The power supply device 10 supplies power and performs communication via the cable 30. The power reception device 20 receives the power supplied from the power supply device 10 and performs communication with the power supply device 10 via the cable 30.

The cable 30 is for establishing the power supply and the communication between the power supply device 10 and the power reception device 20. The communication and the power transmission between the power supply device 10 and the power reception device 20 are performed in the same electrical wire of the cable 30. The power supply from the power supply device 10 to the power reception device 20 via the cable 30 is performed according to, for example, IEEE802.3af or IEEE802.3at which is the PoE standard. The cable 30 is a two-wire cable, for example, a twisted pair cable.

The power supply device 10 includes a power supply block 11, a power supply communication block 12, and a power supply control block 13. The power supply block 11 supplies power to the power reception device 20 via the cable 30. The power supply control block 13 corresponds to a controller.

The power supply communication block 12 communicates with the power reception device 20 via the cable 30. The power supply control block 13 controls the power supply performed by the power supply block 11 and the communication performed by the power supply communication block 12.

The power reception device 20 includes a power reception block 21, a power reception communication block 22, a power reception control block 23, and a request switch 24. The power reception block 21 receives power from the power supply device 10 via the cable 30. The power reception block 21 converts a supply voltage which is a voltage received from the power supply device 10 into a drive voltage which is a voltage with which the power reception communication block 22 and the power reception control block 23 operate. The power reception block 21 supplies the drive voltage to the power reception communication block 22 and the power reception control block 23.

The power reception communication block 22 communicates with the power supply device 10 via the cable 30. The power reception control block 23 controls the power reception performed by the power reception block 21 and the communication performed by the power reception communication block 22.

The power reception control block 23 transmits a stop request signal by the communication via the power reception communication block 22 to stop the operation of the power reception device 20, for example, when detecting an abnormality in the power reception device 20. The request switch 24 is a physical switch that requests the power supply device 10 to supply power via the cable 30.

Figure 2:
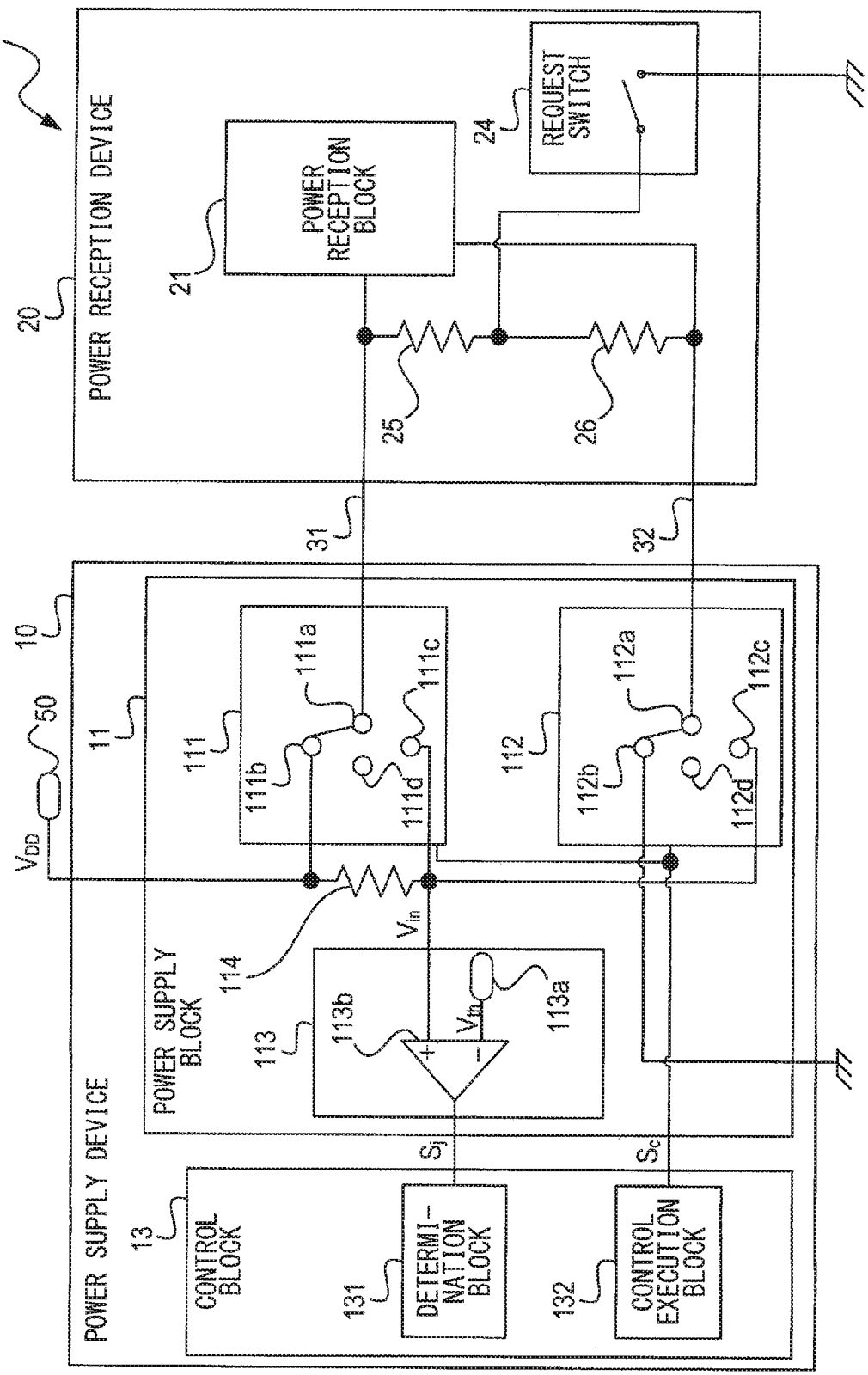
FIG. 2 is a block diagram showing a detailed configuration of the PoE power supply system.

A detailed configuration of the PoE power supply system 1 will be described with reference to FIG. 2. The power supply communication block 12 and the power reception communication block 22 perform communication according to Ethernet (registered trademark) standard, whose detailed descriptions will be omitted in the present disclosure.

Further, detailed descriptions of control of the power reception and the communication performed by the power reception control block 23 will be omitted in the present disclosure. Hereinafter, descriptions will be mainly given of the configurations relating to the control in which the power reception block 21, which has stopped the power reception, resumes the power reception.

<Cable>

The cable 30 includes a first communication line 31 and a second communication line 32.

<Power Supply Device>

The power supply block 11 includes a first switching block 111, a second switching block 112, and a determining circuit 113.

The first switching block 111 includes a first connection node 111a, a first power supply node 111b, a first standby node 111c, and a first stop node 111d. The first connection node 111a is electrically connected to the first communication line 31.

The first power supply node 111b is electrically connected to a power source 50. Hereinafter, a voltage input from the power source 50 is expressed as a power source voltage $V_{DD}$. The first standby node 111c is electrically connected to the determining circuit 113.

The first power supply node 111b and the first standby node 111c are electrically connected across a power supply resistor 114. Hereinafter, a resistance value of the power supply resistor 114 is expressed as $R_{114}$. The first stop node 111d is electrically disconnected.

Similarly to the first switching block 111, the second switching block 112 also includes a second connection node 112a, a second power supply node 112b, a second standby node 112c, and a second stop node 112d.

The second connection node 112a is electrically connected to the second communication line 32. The second power supply node 112b is connected to a ground. The second standby node 112c is electrically connected to the first standby node 111c.

The second stop node 112d is electrically disconnected. The first connection node 111a is alternatively electrically connected to any one of the first power supply node 111b, the first standby node 111c, and the first stop node 111d. Similarly, the second connection node 112a is alternatively electrically connected to any one of the second power supply node 112b, the second standby node 112c, and the second stop node 112d.

The respective connection partner corresponding to the connection state of the first connection node 111a and the second connection node 112a is switched according to the same control signal Sc respectively input to the first switching block 111 and the second switching block 112.

A connection state in which the first connection node 111a and the first power supply node 111b are electrically connected, and the second connection node 112a and the second power supply node 112b are electrically connected is referred to as a power supply state. A connection state in which the first connection node 111a and the first standby node 111c are electrically connected, and the second connection node 112a and the second standby node 112c are electrically connected is referred to as a standby state. A connection state in which the first connection node 111a and the first stop node 111d are electrically connected, and the second connection node 112a and the second stop node 112d are electrically connected is referred to as a stop state.

The determining circuit 113 includes a reference power source 113a and a comparator 113b. The reference power source 113a generates a predetermined threshold voltage $V_{th}$. The comparator 113b outputs a determination signal $S_j$ corresponding to magnitude relation between the threshold voltage $V_{th}$ and a potential of the input signal input to the determining circuit 113. Hereinafter, the potential of the input signal is expressed as an input voltage $V_{in}$. The determination signal $S_j$ output from the comparator 113b is a high-level signal, for example, when the input voltage $V_{in}$ is greater than the threshold voltage $V_{th}$. The determination signal $S_j$ is a low-level signal, for example, when the input voltage $V_{in}$ is equal to or less than the threshold voltage $V_{th}$.

The power supply control block 13 includes a determination block 131 and a control execution block 132. The determination block 131 determines that the power supply request signal has been input when the determination signal $S_j$ input to the power supply control block 13 is a low-level signal.

The control execution block 132 outputs the control signal $S_c$ for switching the connection state to the first switching block 111 and the second switching block 112. As such, the control execution block 132 sets the connection states of the first switching block 111 and the second switching block 112.

The control execution block 132 sets the connection state to the power supply state, for example, when the power supply device 10 is turned on and when the determination block 131 determines that the power supply request signal has been input.

The control execution block 132 sets the connection state to the standby state, for example, when the power supply communication block 12 receives the stop request signal via the cable 30. The control execution block 132 sets the connection state to the stop state, for example, when a standby time, which is a predetermined time after having been set to the standby state, has elapsed. For example, the standby time is set as 30 minutes.

The first switching block 111 and the second switching block 112 correspond to a switching portion and a switching circuit.

<Power Reception Device>

The power reception block 21 is electrically connected to the first communication line 31 and the second communication line 32.

The power reception block 21 receives power via the first communication line 31 and the second communication line 32. When the potential difference between the first communication line 31 and the second communication line 32 is equal to or greater than a preset operation threshold value, the power reception block 21 converts the supply voltage to a drive voltage, and supplies the drive voltage to the power reception communication block 22 and the power reception control block 23. As a result, the power reception communication block 22 and the power reception control block 23 operate, and the communication between the power supply communication block 12 and the power reception communication block 22 via the cable 30 is enabled.

When the potential difference between the first communication line 31 and the second communication line 32 is less than the operation threshold value, the power reception block 21 stops the supply of the drive voltage to the power reception communication block 22 and the power reception control block 23. As a result, the power reception communication block 22 and the power reception control block 23 stops operating, and the communication between the power supply communication block 12 and the power reception communication block 22 via the cable 30 is disabled. The operation threshold value is less than the power source voltage $V_{DD}$ of the power source 50 and greater than the drive voltage.

Between the first communication line 31 and the second communication line 32, a first power reception resistor 25 and a second power reception resistor 26 are connected in series with each other. The first power reception resistor 25 and the second power reception resistor are in parallel with the power reception block 21. Hereinafter, a pair of resistors including the first power reception resistor 25 and the second power reception resistor 26 is referred to as a series resistor.

The request switch 24 is a switch for switching on and off. The request switch 24 has a first end connected to the ground and a second end electrically connected to a common connection end of the first power reception resistor 25 and the second power reception resistor 26. The common connection end is an end between the first power reception resistor 25 and the second power reception resistor 26 to which the first power reception resistor 25 and the second power reception resistor 26 are commonly connected.

2. Operation Example

<Power Supply State>

Figure 3:
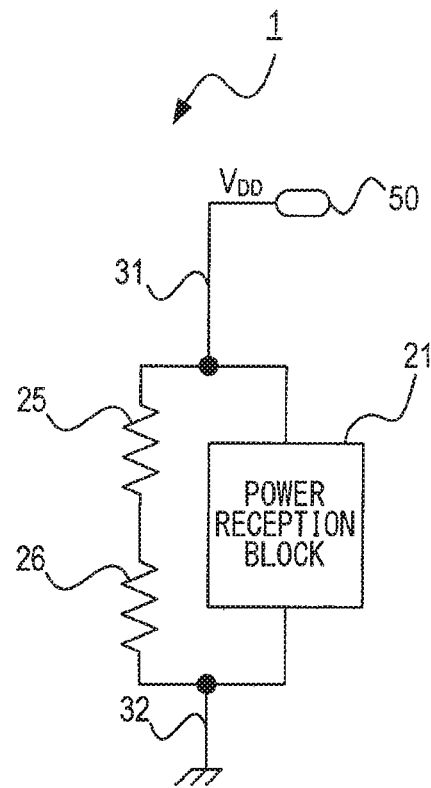
FIG. 3 is a block diagram showing an equivalent circuit of the PoE power supply system in a power supply state.

In the power supply state, the PoE power supply system 1 is represented by an equivalent circuit as shown in FIG. 3. The PoE power supply system 1 is represented by a parallel circuit in which the series resistor and the power reception block 21 are connected in parallel with each other. In the parallel circuit, the power source voltage $V_{DD}$ of the power source 50 is applied to a common connection end of the power reception block 21 and the first power reception resistor 25 via the first communication line 31. A common connection end of the second power reception resistor 26 and the power reception block 21 is grounded via the second communication line 32.

That is, in the power supply state, since the power source voltage $V_{DD}$ is applied to both ends of the power reception block 21, the power reception block 21 is capable of operating and communicating with the power supply device 10 via the cable 30.

At this time, a current also flows through the directly connected first power reception resistor 25 and the second power reception resistor 26, and power is consumed. The resistance values of the first power reception resistor 25 and the second power reception resistor 26 are sufficiently large in order to suppress unnecessary power consumption.

<Standby State>

Figure 4:
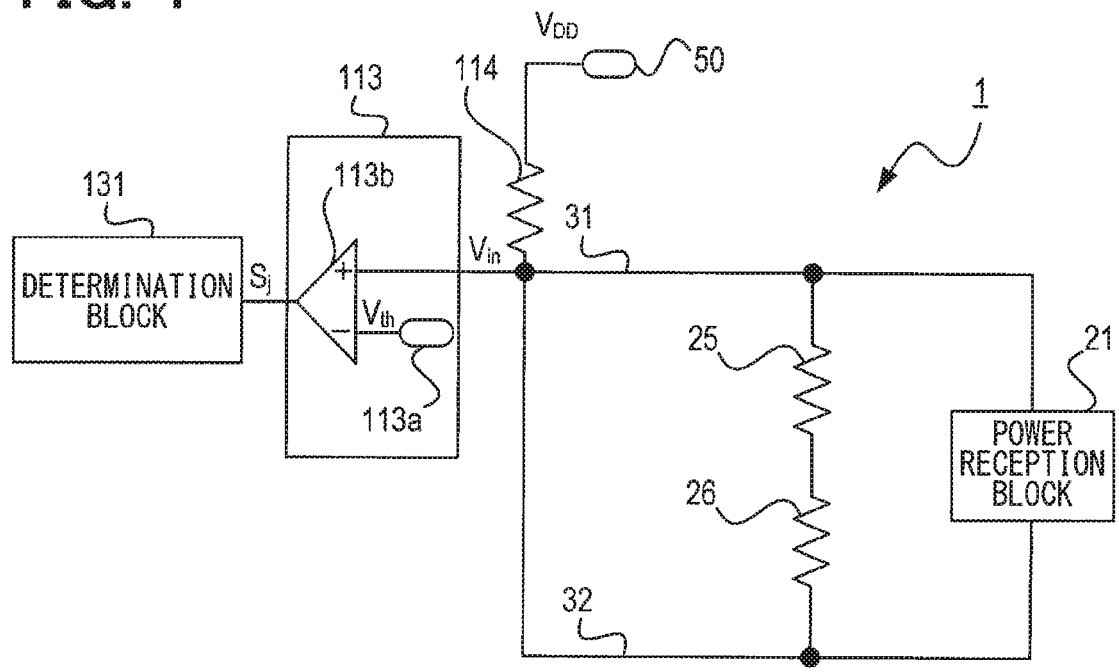
FIG. 4 is a block diagram showing an equivalent circuit of the PoE power supply system in a standby state in which a request switch is in off state.

When the request switch 24 is in the off state in the standby state, the PoE power supply system 1 is represented by an equivalent circuit as shown in FIG. 4.

The series resistor and the power reception block 21 are connected in parallel with each other between the first communication line 31 and the second communication line 32. The power source 50 is connected to the first communication line 31 and the second communication line 32 via the power supply resistor 114.

That is, the first communication line 31 and the second communication line 32 are connected and have the same potential. Therefore, no potential difference occurs between the first communication line 31 and the second communication line 32, and no current flows in the power reception block 21.

Figure 5:
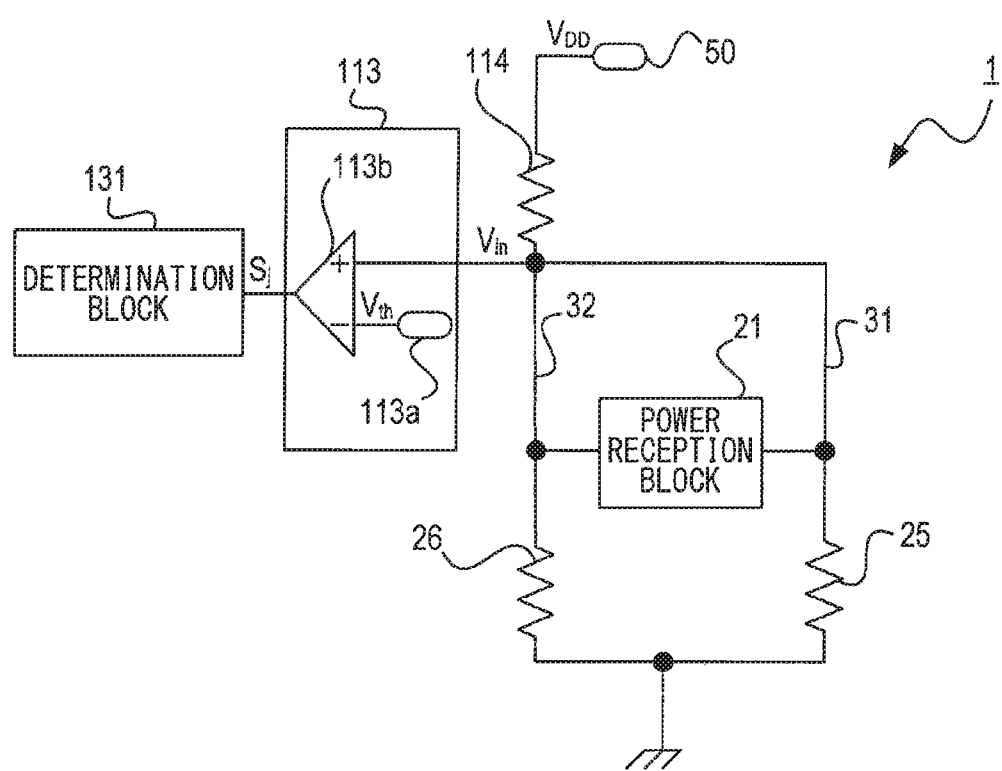
FIG. 5 is a block diagram showing an equivalent circuit of the PoE power supply system in the standby state in which the request switch is in on state.

Since no current flows through the power supply resistor 114, the potential $V_{in}$ of the input signal input to the determining circuit 113 is equal to the power source voltage $V_{DD}$. On the other hand, when the request switch 24 is in the on state in the standby state, the PoE power supply system 1 is represented by an equivalent circuit shown in FIG. 5.

That is, when the request switch 24 is in the on state the standby state, the common connection end between the first power reception resistor 25 and the second power reception resistor 26 constituting the equivalent circuit shown in FIG. 4 is grounded.

Similarly to the state in which the request switch 24 is in the off state in the standby state, the first communication line 31 and the second communication line 32 are connected and have the same potential as in the case where the request switch 24 is in the off state. Therefore, no potential difference occurs between the first communication line 31 and the second communication line 32, and no current flows in the power reception block 21.

The potential of the input signal when the request switch 24 is in the on state in the standby state is expressed as an on voltage $V_{on}$. In this case, the relationship between the on voltage $V_{on}$ and the threshold voltage $V_{th}$ is expressed by an equation (1).

[Equation 1]

$$0 < V_{th} < V_{on} \tag{1}$$

The on voltage $V_{on}$ is expressed by an equation (2).

[Equation 2]

$$V_{on} = \frac{R_x}{R_{114} + R_x} \times V_{DD} \tag{2}$$

The resistance value $R_x$ represents a resistance value of a circuit in which the first power reception resistor 25 and the second power reception resistor 26 are connected in parallel with each other. The resistance value $R_x$ is expressed by an equation (3).

[Equation 3]

$$R_x = \frac{R_{25} \times R_{26}}{R_{25} + R_{26}} \tag{3}$$

That is, the resistance value $R_{25}$ of the first power reception resistor 25 and the resistance value $R_{26}$ of the second power reception resistor 26 are set so as to satisfy the relationship of the equation (1).

When the request switch 24 is in the on state, the potential $V_{in}$ of the input signal becomes the on voltage $V_{on}$ and the potential $V_{in}$ of the input signal becomes less than the threshold voltage $V_{th}$. In this case, the comparator 113b outputs the determination signal $S_j$ of low level.

Upon receiving the low level determination signal $S_j$, the determination block 131 determines that the power supply request signal has been input. When the determination block 131 determines that the power supply request signal is input, the control execution block 132 performs control to switch the connection states of the first switching block 111 and the second switching block 112 from the standby state to the power supply state. As a result, the connection state is set to the power supply state.

<Stop State>

In the stop state, the first connection node 111a and the first stop node 111d are electrically connected, and the second connection node 112a and the second stop node 112d are electrically connected.

As a result, the power supply from the power supply device 10 to the power reception device 20 is stopped. Even when ON and OFF of the request switch 24 is switched, the power supply device 10 does not accept the power supply request signal and cannot switch the connection state to the power supply state.

3. Processing

Next, a power supply processing executed by the PoE power supply system 1 will be described with reference to FIG. 6. The power supply processing is started when the PoE power supply system 1 is activated.

In S110, the PoE power supply system 1 sets the connection state to the power supply state. The setting of the connection state may be performed by the control execution block 132, or may be set in advance so as to become the power supply state in the initial state.

In S120, the PoE power supply system 1 determines whether the stop request signal has been received. When determining that the stop request signal has not been received in S120, the PoE power supply system 1 continues the power supply state.

When the PoE power supply system 1 determines that the stop request signal is received in S120, the processing moves to S130. In S130, the PoE power supply system 1 switches the connection state to the standby state.

In S140, the PoE power supply system 1 determines whether the determination block 131 has received the power supply request signal. When the PoE power supply system 1 determines in S140 that the determination block 131 has received the power supply request signal, the processing moves to S110.

When the PoE power supply system 1 determines in S140 that the determination block 131 has not received the power supply request signal, the processing moves to S150. In S150, the PoE power supply system 1 determines whether the standby time, which is a predetermined time, has elapsed since the connection state has been switched to the standby state.

When the PoE power supply system 1 determines in S150 that the standby time has not elapsed since switching to the standby state, the processing moves to S140. When the PoE power supply system 1 determines in S150 that the standby time has elapsed since switching to the standby state, the processing moves to S160.

In S160, the PoE power supply system 1 switches the connection state to the stop state and ends the processing. That is, according to the processing from S130 to S160, when the power supply request signal is received within the standby time after the connection state is switched to the standby state, the connection state is set to the power supply state, and the power supply from the power supply block 11 to the power reception block 21 It is resumed.

On the other hand, when the power supply request signal is not received within the standby time after the connection state is switched to the standby state, the connection state is switched to the stop state, and the reception of the power supply request signal from the request switch 24 is not accepted.

4. Effects

Hereinafter, a comparative example of the above embodiment will be described.

In the PoE power supply system, when an abnormality occurs in the power reception device, the power reception device may generate heat or stop operating. When the abnormality occurs in the power reception device, the power reception device causes overcurrent to flow through the cable. The power supply device stops supplying the power to the power reception device in response to detecting the overcurrent through the cable. Then, with respect to the power reception device whose power supply is stopped, the power supply is resumed after a lapse of a predetermined time. When the overcurrent is continued, the power supply is stopped again. When the overcurrent is eliminated, the power supply is continued.

In the comparative example, the power supply to the power reception device that is once stopped is not resumed until the predetermined time has elapsed. Therefore, even when the abnormality is eliminated, the operation of the power reception device is not resumed immediately.

According to the embodiment described above, the following effects are achieved.

(1) According to the above-described embodiment, when the power supply state is stopped, the power supply state is switched to the standby state. In the standby state, the same potential voltage is applied to both ends of the power reception block 21. Therefore, the power reception block 21 itself does not operate in the standby state.

However, the power source voltage $V_{DD}$ is applied to the power reception device 20 via the first communication line 31 and the second communication line 32. When the request switch 24 provided in the power reception device 20 is turned on, the potential $V_{in}$ of the input signal input to the determining circuit 113 of the power supply device 10 changes from the power source voltage $V_{DD}$ to the on voltage $V_{on}$. The determination block 131 provided in the power supply device 10 receives the change in the voltage as the request signal and resumes the power supply.

That is, by operating the request switch 24, the power supply by the power supply device 10 is resumed.

(2) The request switch 24 is a physical switch that can be operated by a user. Therefore, the user can switch on and off of the request switch 24, and the user can resume the power supply by the power supply device 10 at an arbitrary timing.

(3) The connection state is switched to the stop state after the standby time has elapsed since the connection state is switched to the standby state. In the stop state, the application of the power source voltage $V_{DD}$ from the power supply device 10 via the cable 30 is stopped. Accordingly, the power consumption accompanying the application of the power source voltage $V_{DD}$ via the cable 30 can be reduced.

5. Other Embodiments

Although the embodiment of the present disclosure has been described above, the present disclosure is not limited to the above-described embodiment, and various modifications can be made.

(1) In the above embodiment, the connection state is switched to the stop state after the standby time has elapsed since the connection state has been switched to the standby state. However, the switching of the connection state is not limited to the embodiment. For example, the standby state may be continued until the determination block 131 receives the power supply request signal after the connection state is switched to the standby state. That is, the connection state may not include the stop state and may include only the power supply state and the standby state.

(2) In the above embodiment, the request switch 24 is integrally provided with the power reception device 20. However, the request switch 24 is not limited to a switch that is integrally provided with the power reception device 20. For example, the request switch 24 may be equipped outside of the power reception device 20.

(3) In the above embodiment, the determining circuit 113 includes the reference power source 113a and a comparator 113b. The comparator 113b outputs a high-level determination signal $S_j$ when the input voltage $V_{in}$ is greater than the threshold voltage $V_{th}$.

The determining circuit 113 determines that the power supply request signal has been input when the determination block 131 determines that the high-level determination signal $S_j$ is input.

However, the configuration of the determining circuit 113 is not limited to a configuration including the comparator and the reference power source. The determining circuit 113 may be capable of determining the ON and OFF switching of the request switch 24.

(4) In the above embodiment, each of the number of the power supply device 10 and the number of the power reception device 20 is one. However, the number of the power supply device 10 and the power reception device 20 are not limited to one. For example, at least one of the number of the power supply device 10 and the number of the power reception device 20 may be greater than one.

(5) A plurality of functions of one element in the above embodiment may be implemented by a plurality of elements, or one function of one element may be implemented by a plurality of elements. A plurality of functions of a plurality of elements may be implemented by one element, or one function implemented by a plurality of elements may be implemented by one element. A part of the configuration of the above embodiment may be omitted. At least a part of the configuration of the above embodiment may be added to or replaced with another configuration of the above embodiment.

(6) In addition to the above-described PoE power supply system, the present disclosure may be adopted to various forms such as a system having the PoE power supply system as a component, a program for causing the computer to function as the PoE power supply system, a non-transitory tangible storage medium such as a semiconductor memory for storing the program, a method for PoE power supplying.

(7) For example, the portion of the PoE power supply system 1 performing the power supply processing of FIG. 6 may be configured by a microcomputer having a CPU and a semiconductor memory (hereinafter, referred to as a memory) such as RAM or ROM. In this case, at least a part of the functions of the PoE power supply system 1 may be implemented by a CPU executing a program stored in a non-transitory tangible storage medium. In this example, the memory corresponds to the non-transitory tangible storage medium storing the program. In addition, a method corresponding to the program is performed by executing the program.

Figure 6:
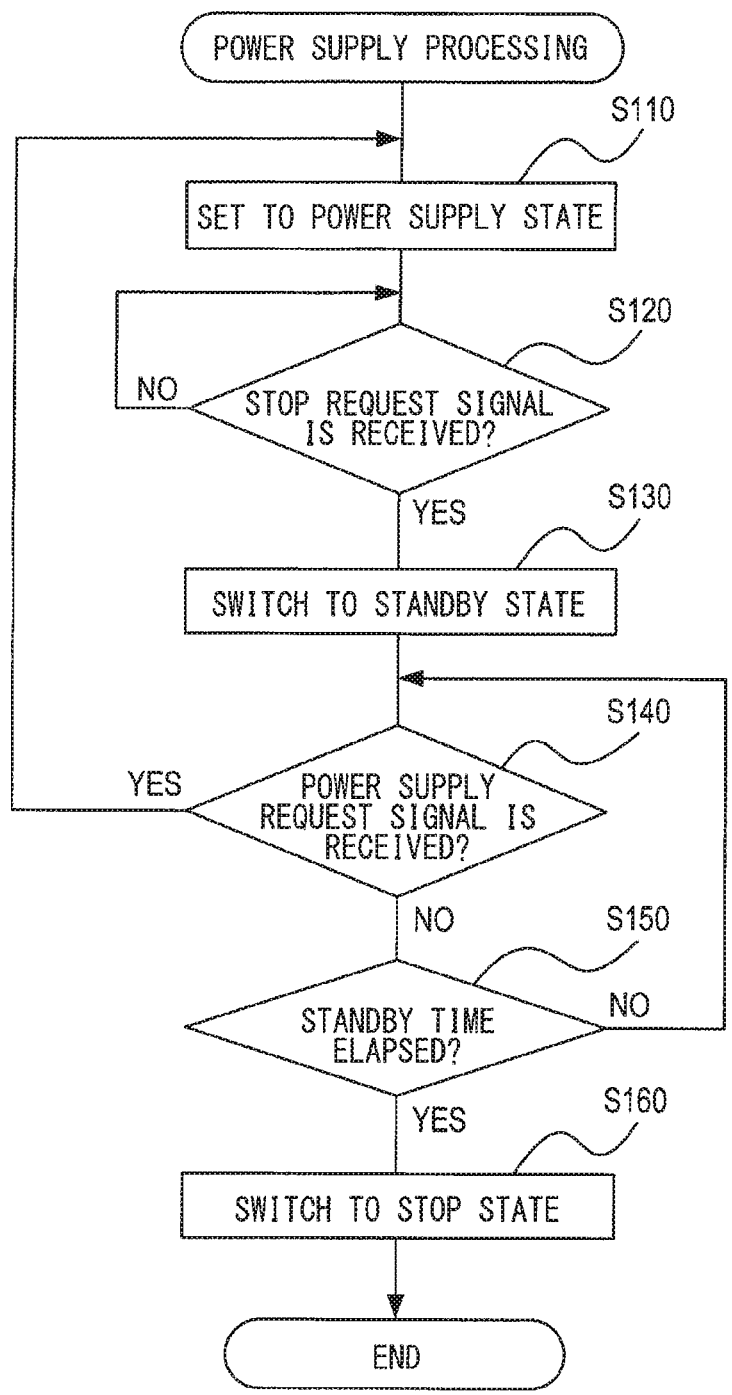
FIG. 6 is a flowchart showing a power supply processing.

Alternatively, the portion of the PoE power supply system 1 performing the power supply processing of FIG. 6 may be implemented by one or more hardware. For example, when the portion of the PoE power supply system 1 performing the power supply processing of FIG. 6 is implemented by an electronic circuit which is hardware, the electronic circuit may be implemented by a digital circuit, an analog circuit, or a combination thereof.

Optional aspects of the present disclosure will be set forth in the following clauses.

According to a first aspect of the present disclosure, a PoE power supply system using a network performing communication based on Ethernet (registered trademark) standard includes a cable, a power supply device, a power reception device, and a request switch. The cable is configured to establish the communication in the network and power transmission in the same electrical wire. The power supply device is configured to supply power via the cable. The power reception device is configured to operate with the power received via the cable and perform the communication. The request switch is configured to transmit a power supply request signal to the power supply device via the cable. The power supply request signal requests the power supply device to resume supplying the power.

The power supply device includes a power supply block and a power supply control block. The power supply block is configured to enable a connection state between the power supply device and the cable to be switched. The connection state includes a power supply state and a standby state. The power supply control block is configured to switch the connection state to the power supply state in response to receiving the power supply request signal from the request switch. The power supply state is a state in which the power supply device is supplied with power required for operating the power supply device via the cable. The standby state is a state in which the power supply request signal is receivable by the power supply device via the cable.

According to the first aspect of the present disclosure, the PoE power supply system can immediately resume the operation of the power reception device by the request switch outputting the power supply request signal, for example, when the abnormality is eliminated in the power reception device.

According to a second aspect of the present disclosure, a PoE power supply system includes a cable, a power supplier, a power receiver, and a request switch. The cable establishes communication and power transmission in the same electrical wire. The power supplier is connected to the cable and suppliers power via the cable. The power receiver is connected to the power supplier via the cable. The power receiver operates with the power received via the cable and performs the communication with the power supplier. The request switch is connected to the power supplier via the cable and transmits a power supply request signal to the power supplier via the cable. The power supply request signal requests the power supplier to supply the power.

The power supplier includes a switching circuit and a controller. The switching circuit is configured to enable a connection state between the power supplier and the cable to be switched. The connection state includes a power supply state and a standby state. The controller is configured to switch the connection state to the power supply state in response to receiving the power supply request signal from the request switch. The power supply state is a state in which the power receiver is supplied with the power via the cable. The standby state is a state in which the power supply request signal is receivable by the power supplier via the cable.

According to the second aspect of the present disclosure, the PoE power supply system can immediately supply the power to the power receiver in response to receiving the power supply request signal.

What is claimed is:

1. A Power over Ethernet (PoE) power supply system using a network performing communication based on Ethernet (registered trademark) standard, the PoE power supply system comprising:
   a cable configured to establish the communication in the network and power transmission in a same electrical wire;
   a power supply device configured to supply power via the cable, the power supply device including a power supply block and a power supply control block;
   a power reception device configured to operate with the power received via the cable and perform the communication; and
   a request switch configured to transmit a power supply request signal to the power supply device via the cable, the power supply request signal requesting the power supply device to resume supplying the power, wherein
the power supply block is configured to enable a connection state between the power supply device and the cable to be switched,
the connection state includes:
  a power supply state in which the power supply device is supplied with power required for operating the power supply device via the cable;
  a standby state in which the power supply request signal is receivable by the power supply device via the cable; and
  a stop state in which a supply of power from the power supply device to the power reception device via the cable is stopped, and
the power supply control block is configured to:
  switch the connection state to the standby state in response to receiving a stop request signal from the power reception device via the cable;
  switch the connection state to the stop state in response to the power supply request signal not being received within a standby time after switching to the standby state; and
  switch the connection state to the power supply state in response to receiving the power supply request signal from the request switch within the standby time after switching to the standby state.

2. The PoE power supply system according to claim 1, wherein
the cable connecting the power supply device and the power reception device includes a first communication line and a second communication line,
the power supply block includes a switching portion configured to:
  in the power supply state, connect the first communication line to a power source and connect the second communication line to a ground; and
  in the standby state, connect the first communication line and the second communication line to the power source via a power supply resistor and connect the first communication line and the second communication line to the power supply control block,
the request switch has a first end connected to a common connection end of a pair of resistors that is connected in series with each other between the first communication line and the second communication line, and
the request switch has a second end connected to the ground.

3. The PoE power supply system according to claim 2, wherein
the power supply block further includes a determining circuit configured to determine whether a potential of an input signal input via the switching portion in the standby state is greater than a threshold voltage, and
the power supply control block is configured to determine that the power supply request signal is received in response to the determining circuit determining that the potential of the input signal is greater than the threshold voltage.

4. The PoE power supply system according to claim 1, wherein
the request switch is integrally provided with the power reception device.

5. A Power over Ethernet (PoE) power supply system comprising:
a cable that establishes communication and power transmission in a same electrical wire;
a power supplier that is connected to the cable and supplies power via the cable, the power supplier including a switching circuit and a controller;
a power receiver that is connected to the power supplier via the cable, the power receiver operating with the power received via the cable and performing the communication with the power supplier via the cable; and
a request switch that is connected to the power supplier via the cable and transmits a power supply request signal to the power supplier via the cable, the power supply request signal requesting the power supplier to supply the power, wherein
the switching circuit is configured to enable a connection state between the power supplier and the cable to be switched,
the connection state includes:
  a power supply state in which the power receiver is supplied with the power via the cable;
  a standby state in which the power supply request signal is receivable by the power supplier via the cable; and
  a stop state in which a supply of power from the power supplier to the power receiver via the cable is stopped, and
the controller is configured to:
  switch the connection state to the standby state in response to receiving a stop request signal from the power receiver via the cable;
  switch the connection state to the stop state in response to the power supply request signal not being received within a standby time after switching to the standby state; and
  switch the connection state to the power supply state in response to receiving the power supply request signal from the request switch within the standby time after switching to the standby state.

6. A Power over Ethernet (PoE) power supply system using a network performing communication based on Ethernet (registered trademark) standard, the PoE power supply system comprising:
a cable configured to establish the communication in the network and power transmission in a same electrical wire;
a power supply device configured to supply power via the cable, the power supply device including a power supply block and a power supply control block;
a power reception device configured to operate with the power received via the cable and perform the communication; and
a request switch configured to transmit a power supply request signal to the power supply device via the cable, the power supply request signal requesting the power supply device to resume supplying the power, wherein
the power supply block is configured to enable a connection state between the power supply device and the cable to be switched,
the connection state includes:
  a power supply state in which the power supply device is supplied with power required for operating the power supply device via the cable; and
  a standby state in which the power supply request signal is receivable by the power supply device via the cable,
the power supply control block is configured to switch the connection state to the power supply state in response to receiving the power supply request signal from the request switch the cable connecting the power supply device and the power reception device includes a first communication line and a second communication line, the power supply block includes a switching portion configured to:

in the power supply state, connect the first communication line to a power source and connect the second communication line to a ground; and in the standby state, connect the first communication line and the second communication line to the power source via a power supply resistor and connect the first communication line and the second communication line to the power supply control block, and the request switch has a first end connected to a common connection end of a pair of resistors that is connected in series with each other between the first communication line and the second communication line, and the request switch has a second end connected to the ground.

* * * * *